United States Patent
Lei et al.

(10) Patent No.: US 12,512,669 B2
(45) Date of Patent: Dec. 30, 2025

(54) MULTI-NODE SERVER AND RACK SERVER

(71) Applicant: MITAC COMPUTING TECHNOLOGY CORPORATION, Taoyuan (TW)

(72) Inventors: Yun-Shan Lei, Taoyuan (TW); Lung-Chiao Chang, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 18/772,558

(22) Filed: Jul. 15, 2024

(65) Prior Publication Data

US 2025/0192549 A1    Jun. 12, 2025

(30) Foreign Application Priority Data

Dec. 7, 2023 (TW) ................. 112147761

(51) Int. Cl.
*H02J 3/00* (2006.01)
*G06F 1/30* (2006.01)

(52) U.S. Cl.
CPC ............ *H02J 3/0012* (2020.01); *G06F 1/305* (2013.01); *H02J 3/0073* (2020.01); *H02J 2203/10* (2020.01)

(58) Field of Classification Search
CPC .... H02J 3/0012; H02J 3/0073; H02J 2203/10; G06F 1/305; G06F 1/189; G06F 1/263
USPC .......................................................... 307/64
See application file for complete search history.

(56) References Cited

U.S. PATENT DOCUMENTS

| | | | |
|---|---|---|---|
| 2006/0082222 A1* | 4/2006 | Pincu .................... | G06F 1/3203 307/29 |
| 2022/0026972 A1* | 1/2022 | Shah ....................... | G06F 1/324 |
| 2025/0004520 A1* | 1/2025 | Goergen ................. | G06F 1/266 |

FOREIGN PATENT DOCUMENTS

| | | |
|---|---|---|
| CN | 112584463 A | 3/2021 |
| TW | 201445936 A | 12/2014 |

OTHER PUBLICATIONS

Taiwan Patent Office, Office Action, Patent Application Serial No. TW112147761, issued Jun. 26, 2024.

* cited by examiner

*Primary Examiner* — Richard Tan
(74) *Attorney, Agent, or Firm* — RABIN & BERDO, P.C.

(57) ABSTRACT

A multi-node server includes a plurality of nodes. Each of the nodes includes a power supply, a transmission circuit, and a control circuit. The power supply is configured to provide a power source. The transmission circuit is configured to transmit the power source and a power status signal to the transmission circuit of the two adjacent nodes, and receive the power source and the power status signal of the two adjacent nodes. The control circuit is configured to control the transmission circuit and the power supply to transmit the power source and the power status signal to the transmission circuit of the two adjacent nodes. The transmission circuit of each of the nodes are connected in series as a ring circuit. The number of the nodes is N, the power of the power supply is $P_s$, the total power budget of the multi-node server is $P_b$, and $P_s = P_b/(N-1)$.

20 Claims, 2 Drawing Sheets

MULTI-NODE SERVER AND RACK SERVER

CROSS-REFERENCE TO RELATED APPLICATION

This non-provisional application claims priority under 35 U.S.C. § 119(a) to patent application No. 112147761 filed in Taiwan, R.O.C. on Dec. 7, 2023, the entire contents of which are hereby incorporated by reference.

BACKGROUND

Technical Field

The present invention relates to the power setting of the power supply in a server, in particular relates to a multi-node server and a rack server.

Related Art

In a general multi-node server, to ensure stable power supply for the server, besides the primary power supply used to supply power to each node, a backup power supply with the same power as the primary power supply is installed in each node. When the primary power supply in a node fails, the server will switch to the backup power supply to supply power to the node, preventing the server from being unable to operate due to the failure of the primary power supply in a node.

However, power supplies are expensive and heavy. Installing two power supplies in each node would significantly increase the cost and weight of the multi-node server.

SUMMARY

In some embodiments, a multi-node server comprises a plurality of nodes. Each of the nodes comprises a power supply, a transmission circuit, and a control circuit. The power supply is configured to provide a power source. The transmission circuit is coupled to the power supply. The transmission circuit is configured to transmit the power source and a power status signal to the transmission circuit of the two adjacent nodes, and is configured to receive the power source and the power status signal of the two adjacent nodes. The control circuit is coupled to the power supply and the transmission circuit. The control circuit is configured to control the transmission circuit and the power supply to transmit the power source and the power status signal to the transmission circuit of the two adjacent nodes. The transmission circuit of each of the nodes are connected in series as a ring circuit. The number of the nodes is N, the power of the power supply is $P_s$, the total power budget of the multi-node server is $P_b$, and $P_s = P_b/(N-1)$.

In some embodiments, the control circuit is further configured to receive the power status signal of the two adjacent nodes through the transmission circuit, and when the control circuit receives the power status signal of the two adjacent nodes, the control circuit sends a boosting power signal to the power supply to increase the power of the power source provided.

In some embodiments, the nodes comprise a first node, a second node, and a third node. The transmission circuit comprises a first connection circuit and a second connection circuit. The first connection circuit of the first node is configured to transmit the power source and the power status signal of the first node to the second connection circuit of the second node coupled to a first side of the first node and is configured to receive the power source and the power status signal of the second node transmitted by the second connection circuit of the second node. The second connection circuit of the first node is configured to transmit the power source and power status signal of the first node to the first connection circuit of the third node coupled to a second side of the first node and is configured to receive the power source and the power status signal of the third node transmitted by the first connection circuit of the third node.

In some embodiments, the power status signal comprises a local fault signal, a first fault signal, and a second fault signal. When the power supply of the first node fails, the control circuit of the first node sends the local fault signal of the first node to the first connection circuit of the first node and the second connection circuit of the first node. When the control circuit of the first node receives the local fault signal or the first fault signal of the second node through the first connection circuit of the first node, the control circuit of the first node sends the first fault signal of the first node to the second connection circuit of the first node. When the control circuit of the first node receives the local fault signal or the second fault signal of the third node through the second connection circuit of the first node, the control circuit of the first node sends the second fault signal of the first node to the first connection circuit of the first node.

In some embodiments, the transmission circuit comprises a selection circuit. The control circuit selectively transmits the local fault signal to the first connection circuit or the second connection circuit through the selection circuit, and selectively transmits the second fault signal to the first connection circuit or transmits the first fault signal to the second connection circuit through the selection circuit.

In some embodiments, the transmission circuit is further configured to transmit a load sharing signal to the transmission circuit of the two adjacent nodes. Each of the control circuits receives the load sharing signal through the transmission circuit and controls the power supply to adjust the power of the power source according to the load sharing signal and output the adjusted power source.

In some embodiments, a rack server comprises a plurality of servers. Each of the servers comprises a power supply, a transmission circuit, and a control circuit. The power supply is configured to provide a power source. The transmission circuit is coupled to the power supply. The transmission circuit is configured to transmit the power source and a power status signal to the transmission circuit of the two adjacent servers, and is configured to receive the power source and the power status signal of the two adjacent servers. The control circuit is coupled to the power supply and the transmission circuit. The control circuit is configured to control the transmission circuit and the power supply to transmit the power source and the power status signal to the transmission circuit of the two adjacent servers. The transmission circuit of each of the servers are connected in series as a ring circuit. The number of the servers is N, the power of the power supply is $P_s$, the total power budget of the rack server is $P_b$, and $P_s = P_b/(N-1)$.

In some embodiments, the control circuit is further configured to receive the power status signal of the two adjacent servers through the transmission circuit, and when the control circuit receives the power status signal of the two adjacent servers, the control circuit sends a boosting power signal to the power supply to increase the power of the power source provided.

In some embodiments, the servers comprise a first server, a second server, and a third server. The transmission circuit comprises a first connection circuit and a second connection circuit. The first connection circuit of the first server is configured to transmit the power source and the power status signal of the first server to the second connection circuit of the second server coupled to a first side of the first server and is configured to receive the power source and the power status signal of the second server transmitted by the second connection circuit of the second server. The second connection circuit of the first server is configured to transmit the power source and power status signal of the first server to the first connection circuit of the third server coupled to a second side of the first server and is configured to receive the power source and the power status signal of the third server transmitted by the first connection circuit of the third server.

In some embodiments, the power status signal comprises a local fault signal, a first fault signal, and a second fault signal. When the power supply of the first server fails, the control circuit of the first server sends the local fault signal of the first server to the first connection circuit of the first server and the second connection circuit of the first server. When the control circuit of the first server receives the local fault signal or the first fault signal of the second server through the first connection circuit of the first server, the control circuit of the first server sends the first fault signal of the first server to the second connection circuit of the first server. When the control circuit of the first server receives the local fault signal or the second fault signal of the third server through the second connection circuit of the first server, the control circuit of the first server sends the second fault signal of the first server to the first connection circuit of the first server.

In some embodiments, the transmission circuit comprises a selection circuit. The control circuit selectively transmits the local fault signal to the first connection circuit or the second connection circuit through the selection circuit, and selectively transmits the second fault signal to the first connection circuit or transmits the first fault signal to the second connection circuit through the selection circuit.

In some embodiments, the transmission circuit is further configured to transmit a load sharing signal to the transmission circuit of the two adjacent servers. Each of the control circuits receives the load sharing signal through the transmission circuit and controls the power supply to adjust the power of the power source according to the load sharing signal and output the adjusted power source.

The following will describe the detailed features and advantages of the instant disclosure in detail in the detailed description. The content of the description is sufficient for any person skilled in the art to comprehend the technical context of the instant disclosure and to implement it accordingly. According to the content, claims and drawings disclosed in the instant specification, any person skilled in the art can readily understand the goals and advantages of the instant disclosure.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
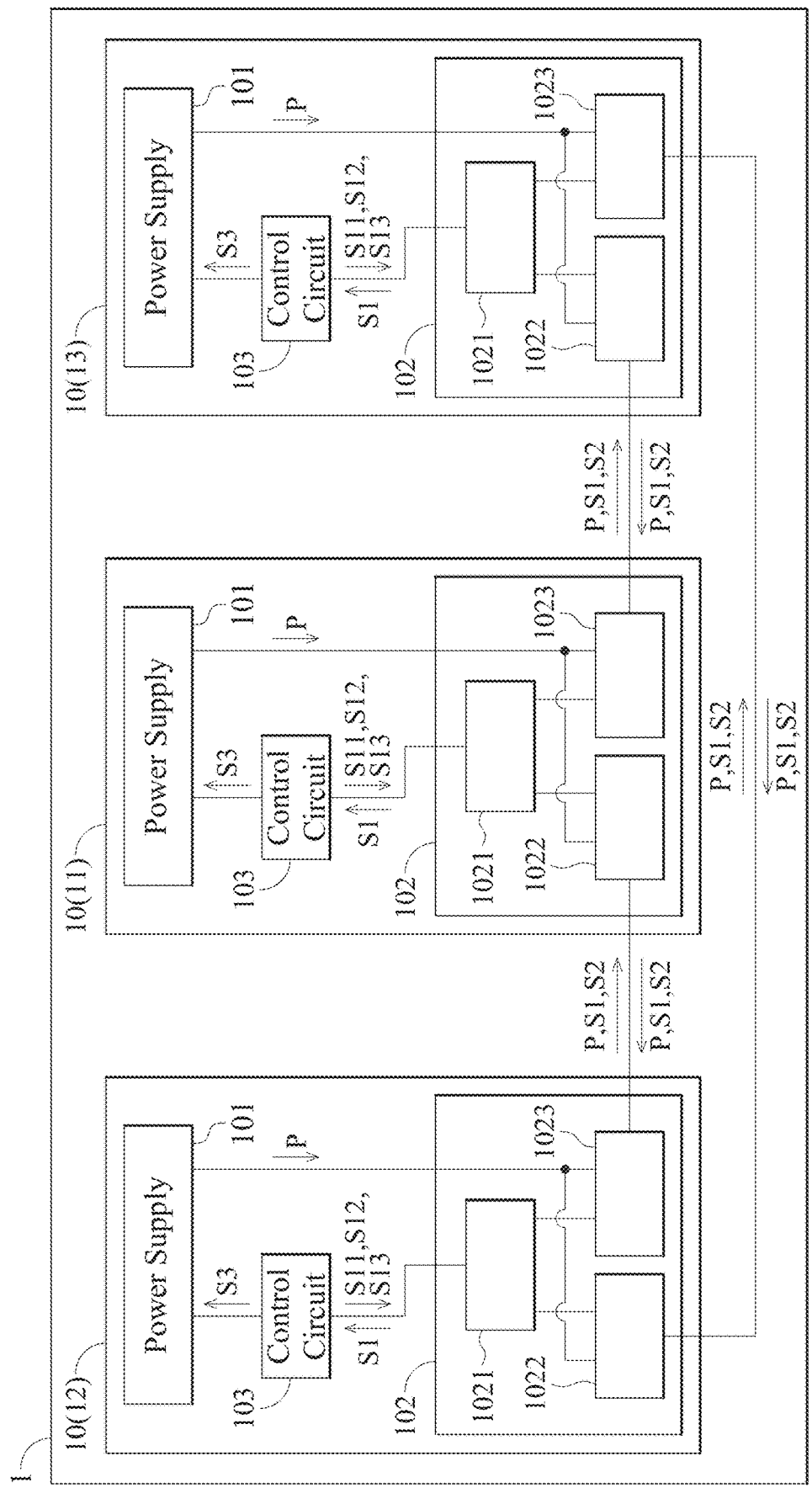
FIG. 1 illustrates a block schematic diagram of an embodiment of a multi-node server.

FIG. 1 illustrates a block schematic diagram of an embodiment of a multi-node server 1. Please refer to FIG. 1.

The multi-node server 1 comprises a plurality of nodes 10. Each of the nodes 10 comprises a power supply 101, a transmission circuit 102, and a control circuit 103. The transmission circuit 102 is coupled to the power supply 101. The control circuit 103 is coupled to the power supply 101 and the transmission circuit 102. In the embodiment of FIG. 1, the multi-node server 1 comprises three nodes 10, but the number of the nodes 10 is not limited thereto.

The power supply 101 is configured to provide a power source P. In some embodiments, the voltage of the power source P may be, but is not limited to, 12 volts (V). In some embodiments, the power source P comprises a plurality of voltage signals, but the present invention is not limited thereto. The power source P may comprise only one voltage signal. In some embodiments, one of the plurality of voltage signals comprised in the power source P may be, but is not limited to, a standby signal.

In some embodiments, the transmission circuit 102 of each of the nodes 10 are connected in series as a ring circuit. Therefore, each of the nodes 10 has two adjacent nodes 10 because the transmission circuit 102 of each of the nodes 10 are connected in series as a ring circuit. The transmission circuit 102 is configured to transmit the power source P and a power status signal S1 to the transmission circuit 102 of the two adjacent nodes 10, and is configured to receive the power source P and the power status signal S1 of the two adjacent nodes 10. In some embodiments, the transmission circuit 102 is embedded in its corresponding node 10 in a pluggable manner.

In some embodiments, the transmission circuit 102 may be, but is not limited to, an adapter board. In some embodiments, the port used by the transmission circuit 102 to transmit the power source P and the port used to transmit the power status signal S1 are different ports, but the present invention is not limited thereto. The port used by the transmission circuit 102 to transmit the power source P and the port used to transmit the power status signal S1 may be different pins of the same port. In some embodiments, the port used by the transmission circuit 102 to transmit the power source P and the port used to receive the power source P of the two adjacent nodes 10 are the same port, and the port used by the transmission circuit 102 to transmit the power status signal S1 and the port used to receive the power source P of the two adjacent nodes 10 are the same port, but the present invention is not limited thereto. In some embodiments, the power status signal S1 of each of the nodes 10 is used to record information about whether the power supply 101 of each of the nodes 10 itself and its two adjacent nodes 10 fails.

The control circuit 103 is configured to control the transmission circuit 102 and the power supply 101 to transmit the power source P and the power status signal S1 to the transmission circuit 102 of the two adjacent nodes 10. In some embodiments, The control circuit 103 may be, but is not limited to, a baseboard management controller (BMC), a field programmable gate array (FPGA), or a complex programmable logic device (CPLD).

If the number of the nodes 10 comprised in the multi-node server 1 is N, the power of the power supply 101 is $P_s$, and the total power budget of the multi-node server 1 is $P_b$, in some embodiments, $P_s=P_b/(N-1)$. For example, if the number of the nodes 10 comprised in the multi-node server 1 is 3, and the total power budget of the multi-node server 1 is 300 watts (W), at this time, the power of the power supply 101 of each of the nodes 10 is $300/(3-1)=150$ W. That is, the total power of the power supply 101 of each of the nodes 10 at this time is $150\times3=450$ W. In other words, the total power of the power supply 101 of each of the nodes 10 at this time is greater than the total power budget of the multi-node server 1.

When one of the power supplies 101 of the nodes 10 fails, the control circuit 103 of the node 10 comprising the failed power supply 101 records failure information of the power supply 101 in the power status signal S1. When the control circuit 103 of each of the non-failed nodes 10 receives the power status signal S1 with information about the failure of one of the power supplies 101 through the transmission circuit 102, the control circuit 103 sends a boosting power signal S3 to the power supply 101 to increase the power of the power source P provided, and the increased power source P is transmitted to the failed node 10 through the transmission circuit 102, so that the failed node 10 can still operate normally. And since $P_s=P_b/(N-1)$, the total power of the remaining non-failed power supplies 101 of the nodes 10 at this time is equal to the total power budget of the multi-node server 1. In other words, the total power provided by the remaining non-failed power supplies 101 of the nodes 10 is still sufficient for the multi-node server 1 to operate normally.

As for the multi-node server of the prior art, when the total power budget of the multi-node server of the prior art is 300 W and the number of nodes of the multi-node server of the prior art is 3, the multi-node server comprises a total of 6 power supplies with a power of 100 W.

As can be seen from the above example, the number of the power supplies 101 comprised in the multi-node server 1 of the present invention is only half of the number of the power supplies comprised in the multi-node server of the prior art. In other words, the cost and weight of the multi-node server 1 are significantly reduced compared to the multi-node servers of the prior art.

In some embodiments, the nodes 10 comprise a first node 11, a second node 12, and a third node 13. The transmission circuit 102 comprises a first connection circuit 1022 and a second connection circuit 1023. The first connection circuit 1022 of the first node 11 is configured to transmit the power source P and the power status signal S1 of the first node 11 to the second connection circuit 1023 of the second node 12 coupled to a first side of the first node 11 and is configured to receive the power source P and the power status signal S1 of the second node 12 transmitted by the second connection circuit 1023 of the second node 12. The second connection circuit 1023 of the first node 11 is configured to transmit the power source P and power status signal S1 of the first node 11 to the first connection circuit 1022 of the third node 13 coupled to a second side of the first node 11 and is configured to receive the power source P and the power status signal S1 of the third node 13 transmitted by the first connection circuit 1022 of the third node 13.

In some embodiments, the first connection circuit 1022 and the second connection circuit 1023 comprise a signal splitter circuit and a power distribution circuit. The signal splitter circuit of the first connection circuit 1022 of the first node 11 is configured to transmit the power status signal S1 of the first node 11 to the signal splitter circuit of the second connection circuit 1023 of the second node 12 coupled to the first side of the first node 11, and to receive the power status signal S1 of the second node 12 transmitted by the signal splitter circuit of the second connection circuit 1023 of the second node 12. The power distribution circuit of the first connection circuit 1022 of the first node 11 is configured to transmit the power source P of the first node 11 to the power distribution circuit of the second connection circuit 1023 of the second node 12 coupled to the first side of the first node 11, and to receive the power source P of the second node 12 transmitted by the power distribution circuit of the second connection circuit 1023 of the second node 12. The signal splitter circuit of the second connection circuit 1023 of the first node 11 is configured to transmit the power status signal S1 of the first node 11 to the signal splitter circuit of the first connection circuit 1022 of the third node 13 coupled to the second side of the first node 11, and to receive the power status signal S1 of the third node 13 transmitted by the signal splitter circuit of the first connection circuit 1022 of the third node 13. The power distribution circuit of the second connection circuit 1023 of the first node 11 is configured to transmit the power source P of the first node 11 to the power distribution circuit of the first connection circuit 1022 of the third node 13 coupled to the second side of the first node 11, and to receive the power source P of the third node 13 transmitted by the power distribution circuit of the first connection circuit 1022 of the third node 13. In some embodiments, the signal splitter circuit may be, but is not limited to, an I/O expander or a microcontroller (MCU).

In some embodiments, the power status signal S1 comprises a local fault signal S11, a first fault signal S12, and a second fault signal S13. When the power supply 101 of the first node 11 fails, the control circuit 103 of the first node 11 sends the local fault signal S11 of the first node 11 to the first connection circuit 1022 of the first node 11 and the second connection circuit 1023 of the first node 11. When the control circuit 103 of the first node 11 receives the local fault signal S11 or the first fault signal S12 of the second node 12 through the first connection circuit 1022 of the first node 11, the control circuit 103 of the first node 11 sends the first fault signal S12 of the first node 11 to the second connection circuit 1023 of the first node 11. When the control circuit 103 of the first node 11 receives the local fault signal S11 or the second fault signal S13 of the third node 13 through the second connection circuit 1023 of the first node 11, the control circuit 103 of the first node 11 sends the second fault signal S13 of the first node 11 to the first connection circuit 1022 of the first node 11.

In detail, please refer to FIG. 1. The second node 12 is coupled to the left side of the first node 11, and the third node 13 is coupled to the right side of the first node 11. When the power supply 101 of the first node 11 fails, the control circuit 103 of the first node 11 sends a local fault signal S11 of the first node 11 to the first connection circuit 1022 of the first node 11 and the second connection circuit 1023 of the first node 11. At this time, the local fault signal S11 of the first node 11 can be transmitted to the second node 12 through the first connection circuit 1022 of the first node 11 and to the third node 13 through the second connection circuit 1023 of the first node 11.

The first fault signal S12 of each of the nodes 10 indicates that the power supply 101 of any of the nodes 10 on the first side of each of the nodes 10 fails. In the embodiment of FIG. 1, the first fault signal S12 of each of the nodes 10 indicates that the power supply 101 of any of the nodes 10 on the left side of each of the nodes 10 fails. When the control circuit 103 of the first node 11 receives the local fault signal S11 or the first fault signal S12 of the second node 12 through the first connection circuit 1022 of the first node 11 (i.e., when the power supply 101 of the second node 12 fails or any one of the power supplies 101 on the left side of the second node 12 fails), the control circuit 103 of the first node 11 sends the first fault signal S12 of the first node 11 to the second connection circuit 1023 of the first node 11. At this time, the first fault signal S12 of the first node 11 can be transmitted to the third node 13 through the second connection circuit 1023 of the first node 11. In other words, when the control circuit 103 of the first node 11 sends the first fault signal S12 of the first node 11 to the second connection circuit 1023 of the first node 11, it indicates that the power supply 101 of any of the nodes 10 on the left side of the first node 11 fails, and the information about the failure of the power supply 101 of any of the nodes 10 on the left side of the first node 11 can be transmitted to the third node 13 on the right side of the first node 11 through the second connection circuit 1023 of the first node 11.

The second fault signal S13 of each of the nodes 10 indicates that the power supply 101 of any of the nodes 10 on the second side of each of the nodes 10 fails. In the embodiment of FIG. 1, the second fault signal S13 of each of the nodes 10 indicates that the power supply 101 of any of the nodes 10 on the right side of each of the nodes 10 fails. When the control circuit 103 of the first node 11 receives the local fault signal S11 or the second fault signal S13 of the third node 13 through the second connection circuit 1023 of the first node 11 (i.e., when the power supply 101 of the third node 13 fails or any one of the power supplies 101 on the right side of the third node 13 fails), the control circuit 103 of the first node 11 sends the second fault signal S13 of the first node 11 to the first connection circuit 1022 of the first node 11. At this time, the second fault signal S13 of the first node 11 can be transmitted to the second node 12 through the first connection circuit 1022 of the first node 11. In other words, when the control circuit 103 of the first node 11 sends the second fault signal S13 of the first node 11 to the first connection circuit 1022 of the first node 11, it indicates that the power supply 101 of any of the nodes 10 on the right side of the first node 11 fails, and the information about the failure of the power supply 101 of any of the nodes 10 on the right side of the first node 11 can be transmitted to the second node 12 on the right side of the first node 11 through the first connection circuit 1022 of the first node 11.

It should be noted that the above-mentioned first fault signal S12 and second fault signal S13 are only used to indicate that the power supply 101 of any of the nodes 10 fails on the first side or the second side of the node 10. It is necessary to increase the number of ports or registers in the first connection circuit 1022 and the second connection circuit 1023 to know the number of the failed power supplies 101.

As the information about the failure of the power supply 101 of each of the nodes 10 can be transmitted to all nodes 10 of the multi-node server 1 through the local fault signal S11, the first fault signal S12, the second fault signal S13, and the transmission circuit 102 of each of the nodes 10 connected in series as a ring circuit, when any of the power supplies 101 of the nodes 10 comprised in the multi-node server 1 fails, the control circuit 103 of each of the non-failed nodes 10 can directly receive the failure information through the transmission circuit 102 and immediately send the boosting power signal S3 to increase the power of the power source P provided by the power supply 101 of each of the non-failed nodes 10. The power source P, after being boosted, can also be directly transmitted through the transmission circuit 102 to the failed node 10, so that the multi-node server 1 can still operate normally. There is no need to wait for the control circuit 103 of the node 10 with the failed power supply 101 to transmit the failure information to the main control end of the multi-node server 1 for control by the main control end, but the present invention is not limited thereto. The information about the failure of the power supply 101 of each of the nodes 10 can also be transmitted to the main control end of the multi-node server 1 through the control circuit 103 of the node 10 with the failed power supply 101, and then controlled by the main control end of the multi-node server 1.

In some embodiments, the transmission circuit 102 comprises a selection circuit 1021. The control circuit 103 selectively transmits the local fault signal S11 to the first connection circuit 1022 or the second connection circuit 1023 through the selection circuit 1021, and selectively transmits the second fault signal S13 to the first connection circuit 1022 or transmits the first fault signal S12 to the second connection circuit 1023 through the selection circuit 1021. That is, the occurrence time of the control circuit 103 sending the local fault signal S11 to the first connection circuit 1022 and the occurrence time of the control circuit 103 sending the local fault signal S11 to the second connection circuit 1023 are mutually exclusive and will not occur at the same time. Similarly, the occurrence time of the control circuit 103 transmits the second fault signal S13 to the first connection circuit 1022 and the occurrence time of the control circuit 103 transmits the first fault signal S12 to the second connection circuit 1023 are also mutually exclusive and will not occur at the same time. In some embodiments, the selection circuit 1021 may be, but is not limited to, a multiplexer.

In some embodiments, the transmission circuit 102 is further configured to transmit a load sharing signal S2 to the transmission circuit 102 of the two adjacent nodes 10. In some embodiments, the load sharing signal S2 is jointly provided by the non-failed power supply 101 of each of the nodes 10, and each of the power supplies 101 adjusts the load sharing signal S2 according to its own output status of the power source P. In some embodiments, the power supply 101 of each of the nodes 10 directly transmits and receives the load sharing signal S2 through the transmission circuit 102, and each of the power supplies 101 adjusts the power of the power source P provided according to the received load sharing signal S2, but the present invention is not limited thereto. In some embodiments, each of the control circuits 103 receives the load sharing signal S2 through the transmission circuit 102 and controls the power supply 101 to adjust the power of the power source P according to the load sharing signal S2 and output the adjusted power source P. In detail, the control circuit 103 of each of the nodes 10 adjusts the power of the power source P provided by each of the nodes 10 to be roughly the same according to the load sharing signal S2.

In some embodiments, the port used by the transmission circuit 102 to transmit the load sharing signal S2 and the port used to transmit the power status signal S1 are different pins of the same port, but the present invention is not limited thereto. The port used by the transmission circuit 102 to transmit the load sharing signal S2 and the port used to transmit the power status signal S1 may be different ports.

It is specifically noted that each of the nodes 10 can operate independently based on its own power supply 101. Therefore, in the present invention, each of the nodes 10 that can operate independently will automatically monitor and share their own status and that of the adjacent nodes 10 when configuring adjacent nodes 10, while also sharing their interconnected power source P. In this way, when any of the nodes 10 is heavily loaded, the power supply 101 mounted on it is less likely to be damaged or rapidly aged.

Figure 2:
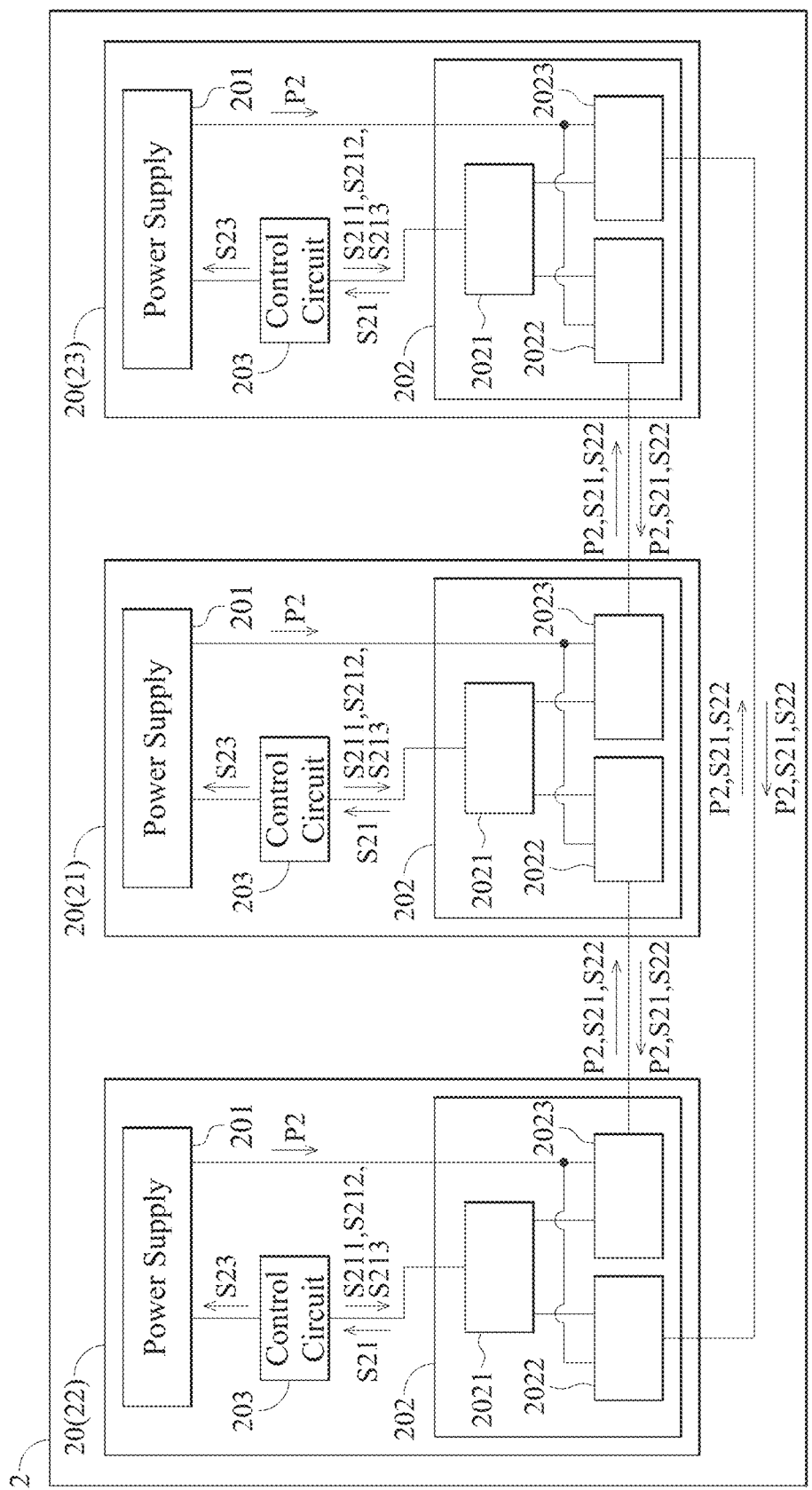
FIG. 2 illustrates a block schematic diagram of an embodiment of a rack server.

FIG. 2 illustrates a block schematic diagram of an embodiment of a rack server 2. Please refer to FIG. 2. The rack server 2 comprises a plurality of servers 20. Each of the servers 20 comprises a power supply 201, a transmission circuit 202, and a control circuit 203. The transmission circuit 202 is coupled to the power supply 201. The control circuit 203 is coupled to the power supply 201 and the transmission circuit 202. In the embodiment of FIG. 2, the rack server 2 comprises three servers 20, but the number of the servers 20 is not limited thereto.

The power supply 201 is configured to provide a power source P2. In some embodiments, the voltage of the power source P2 may be, but is not limited to, 12 volts (V).

In some embodiments, the transmission circuit 202 of each of the servers 20 are connected in series as a ring circuit. Therefore, each of the servers 20 has two adjacent servers 20 because the transmission circuit 202 of each of the servers 20 are connected in series as a ring circuit. The transmission circuit 202 is configured to transmit the power source P2 and a power status signal S21 to the transmission circuit 202 of the two adjacent servers 20, and is configured to receive the power source P2 and the power status signal S21 of the two adjacent servers 20. In some embodiments, the transmission circuit 202 is embedded in its corresponding server 20 in a pluggable manner.

In some embodiments, the transmission circuit 202 may be, but is not limited to, an adapter board. In some embodiments, the power status signal S21 of each of the servers 20 is used to record information about whether the power supply 201 of each of the servers 20 itself and its two adjacent servers 20 fails.

The control circuit 203 is configured to control the transmission circuit 202 and the power supply 201 to transmit the power source P2 and the power status signal S21 to the transmission circuit 202 of the two adjacent servers 20. In some embodiments, The control circuit 203 may be, but is not limited to, a baseboard management controller (BMC), a field programmable gate array (FPGA), or a complex programmable logic device (CPLD).

If the number of the servers 20 comprised in the rack server 2 is N, the power of the power supply 201 is Ps, and the total power budget of the rack server 2 is Pb, in some embodiments, Ps=Pb/(N−1).

When one of the power supplies 201 of the servers 20 fails, the control circuit 203 of the server 20 comprising the failed power supply 201 records failure information of the power supply 201 in the power status signal S21. When the control circuit 203 of each of the non-failed servers 20 receives the power status signal S21 with information about the failure of one of the power supplies 201 through the transmission circuit 202, the control circuit 203 sends a boosting power signal S23 to the power supply 201 to increase the power of the power source P2 provided, and the increased power source P2 is transmitted to the failed server 20 through the transmission circuit 202, so that the failed server 20 can still operate normally. And since Ps=Pb/(N−1), the total power of the remaining non-failed power supplies 201 of the servers 20 at this time is equal to the total power budget of the rack server 2. In other words, the total power provided by the remaining non-failed power supplies 201 of the servers 20 is still sufficient for the rack server 2 to operate normally.

In some embodiments, the servers 20 comprise a first server 21, a second server 22, and a third server 23. The transmission circuit 202 comprises a first connection circuit 2022 and a second connection circuit 2023. The first connection circuit 2022 of the first server 21 is configured to transmit the power source P2 and the power status signal S21 of the first server 21 to the second connection circuit 2023 of the second server 22 coupled to a first side of the first server 21 and is configured to receive the power source P2 and the power status signal S21 of the second server 22 transmitted by the second connection circuit 2023 of the second server 22. The second connection circuit 2023 of the first server 21 is configured to transmit the power source P2 and power status signal S21 of the first server 21 to the first connection circuit 2022 of the third server 23 coupled to a second side of the first server 21 and is configured to receive the power source P2 and the power status signal S21 of the third server 23 transmitted by the first connection circuit 2022 of the third server 23.

In some embodiments, the first connection circuit 2022 and the second connection circuit 2023 comprise a signal splitter circuit and a power distribution circuit. The signal splitter circuit of the first connection circuit 2022 of the first server 21 is configured to transmit the power status signal S21 of the first server 21 to the signal splitter circuit of the second connection circuit 2023 of the second server 22 coupled to the first side of the first server 21, and to receive the power status signal S21 of the second server 22 transmitted by the signal splitter circuit of the second connection circuit 2023 of the second server 22. The power distribution circuit of the first connection circuit 2022 of the first server 21 is configured to transmit the power source P2 of the first server 21 to the power distribution circuit of the second connection circuit 2023 of the second server 22 coupled to the first side of the first server 21, and to receive the power source P2 of the second server 22 transmitted by the power distribution circuit of the second connection circuit 2023 of the second server 22. The signal splitter circuit of the second connection circuit 2023 of the first server 21 is configured to transmit the power status signal S21 of the first server 21 to the signal splitter circuit of the first connection circuit 2022 of the third server 23 coupled to the second side of the first server 21, and to receive the power status signal S21 of the third server 23 transmitted by the signal splitter circuit of the first connection circuit 2022 of the third server 23. The power distribution circuit of the second connection circuit 2023 of the first server 21 is configured to transmit the power source P2 of the first server 21 to the power distribution circuit of the first connection circuit 2022 of the third server 23 coupled to the second side of the first server 21, and to receive the power source P2 of the third server 23 transmitted by the power distribution circuit of the first connection circuit 2022 of the third server 23. In some embodiments, the signal splitter circuit may be, but is not limited to, an I/O expander or a microcontroller (MCU).

In some embodiments, the power status signal S21 comprises a local fault signal S211, a first fault signal S212, and a second fault signal S213. When the power supply 201 of the first server 21 fails, the control circuit 203 of the first server 21 sends the local fault signal S211 of the first server 21 to the first connection circuit 2022 of the first server 21 and the second connection circuit 2023 of the first server 21. When the control circuit 203 of the first server 21 receives the local fault signal S211 or the first fault signal S212 of the second server 22 through the first connection circuit 2022 of the first server 21, the control circuit 203 of the first server 21 sends the first fault signal S212 of the first server 21 to the second connection circuit 2023 of the first server 21. When the control circuit 203 of the first server 21 receives the local fault signal S211 or the second fault signal S213 of the third server 23 through the second connection circuit 2023 of the first server 21, the control circuit 203 of the first server 21 sends the second fault signal S213 of the first server 21 to the first connection circuit 2022 of the first server 21.

In detail, please refer to FIG. 2. The second server 22 is coupled to the left side of the first server 21, and the third server 23 is coupled to the right side of the first server 21. When the power supply 201 of the first server 21 fails, the control circuit 203 of the first server 21 sends a local fault signal S211 of the first server 21 to the first connection circuit 2022 of the first server 21 and the second connection circuit 2023 of the first server 21. At this time, the local fault signal S211 of the first server 21 can be transmitted to the second server 22 through the first connection circuit 2022 of the first server 21 and to the third server 23 through the second connection circuit 2023 of the first server 21.

The first fault signal S212 of each of the servers 20 indicates that the power supply 201 of any of the servers 20 on the first side of each of the servers 20 fails. In the embodiment of FIG. 2, the first fault signal S212 of each of the servers 20 indicates that the power supply 201 of any of the servers 20 on the left side of each of the servers 20 fails. When the control circuit 203 of the first server 21 receives the local fault signal S211 or the first fault signal S212 of the second server 22 through the first connection circuit 2022 of the first server 21 (i.e., when the power supply 201 of the second server 22 fails or any one of the power supplies 201 on the left side of the second server 22 fails), the control circuit 203 of the first server 21 sends the first fault signal S212 of the first server 21 to the second connection circuit 2023 of the first server 21. At this time, the first fault signal S212 of the first server 21 can be transmitted to the third server 23 through the second connection circuit 2023 of the first server 21. In other words, when the control circuit 203 of the first server 21 sends the first fault signal S212 of the first server 21 to the second connection circuit 2023 of the first server 21, it indicates that the power supply 201 of any of the servers 20 on the left side of the first server 21 fails, and the information about the failure of the power supply 201 of any of the servers 20 on the left side of the first server 21 can be transmitted to the third server 23 on the right side of the first server 21 through the second connection circuit 2023 of the first server 21.

The second fault signal S213 of each of the servers 20 indicates that the power supply 201 of any of the servers 20 on the second side of each of the servers 20 fails. In the embodiment of FIG. 2, the second fault signal S213 of each of the servers 20 indicates that the power supply 201 of any of the servers 20 on the right side of each of the servers 20 fails. When the control circuit 203 of the first server 21 receives the local fault signal S211 or the second fault signal S213 of the third server 23 through the second connection circuit 2023 of the first server 21 (i.e., when the power supply 201 of the third server 23 fails or any one of the power supplies 201 on the right side of the third server 23 fails), the control circuit 203 of the first server 21 sends the second fault signal S213 of the first server 21 to the first connection circuit 2022 of the first server 21. At this time, the second fault signal S213 of the first server 21 can be transmitted to the second server 22 through the first connection circuit 2022 of the first server 21. In other words, when the control circuit 203 of the first server 21 sends the second fault signal S213 of the first server 21 to the first connection circuit 2022 of the first server 21, it indicates that the power supply 201 of any of the servers 20 on the right side of the first server 21 fails, and the information about the failure of the power supply 201 of any of the servers 20 on the right side of the first server 21 can be transmitted to the second server 22 on the right side of the first server 21 through the first connection circuit 2022 of the first server 21.

As the information about the failure of the power supply 201 of each of the servers 20 can be transmitted to all servers 20 of the rack server 2 through the local fault signal S211, the first fault signal S212, the second fault signal S213, and the transmission circuit 202 of each of the servers 20 connected in series as a ring circuit, when any of the power supplies 201 of the servers 20 comprised in the rack server 2 fails, the control circuit 203 of each of the non-failed servers 20 can directly receive the failure information through the transmission circuit 202 and immediately send the boosting power signal S23 to increase the power of the power source P2 provided by the power supply 201 of each of the non-failed servers 20. The power source P2, after being boosted, can also be directly transmitted through the transmission circuit 202 to the failed server 20, so that the rack server 2 can still operate normally. There is no need to wait for the control circuit 203 of the server 20 with the failed power supply 201 to transmit the failure information to the main control end of the rack server 2 for control by the main control end, but the present invention is not limited thereto. The information about the failure of the power supply 201 of each of the servers 20 can also be transmitted to the main control end of the rack server 2 through the control circuit 203 of the server 20 with the failed power supply 201, and then controlled by the main control end of the rack server 2.

In some embodiments, the transmission circuit 202 comprises a selection circuit 2021. The control circuit 203 selectively transmits the local fault signal S211 to the first connection circuit 2022 or the second connection circuit 2023 through the selection circuit 2021, and selectively transmits the second fault signal S213 to the first connection circuit 2022 or transmits the first fault signal S212 to the second connection circuit 2023 through the selection circuit 2021. That is, the occurrence time of the control circuit 203 sending the local fault signal S211 to the first connection circuit 2022 and the occurrence time of the control circuit 203 sending the local fault signal S211 to the second connection circuit 2023 are mutually exclusive and will not occur at the same time. Similarly, the occurrence time of the control circuit 203 transmits the second fault signal S213 to the first connection circuit 2022 and the occurrence time of the control circuit 203 transmits the first fault signal S212 to the second connection circuit 2023 are also mutually exclusive and will not occur at the same time. In some embodiments, the selection circuit 2021 may be, but is not limited to, a multiplexer.

In some embodiments, the transmission circuit 202 is further configured to transmit a load sharing signal S22 to the transmission circuit 202 of the two adjacent servers 20. In some embodiments, the load sharing signal S22 is jointly provided by the non-failed power supply 201 of each of the servers 20, and each of the power supplies 201 adjusts the load sharing signal S22 according to its own output status of the power source P2. In some embodiments, the power supply 201 of each of the servers 20 directly transmits and receives the load sharing signal S22 through the transmission circuit 202, and each of the power supplies 201 adjusts the power of the power source P2 provided according to the received load sharing signal S22, but the present invention is not limited thereto. In some embodiments, each of the control circuits 203 receives the load sharing signal S22 through the transmission circuit 202 and controls the power supply 201 to adjust the power of the power source P2 according to the load sharing signal S22 and output the adjusted power source P2.

It is specifically noted that each of the servers 20 can operate independently based on its own power supply 201. Therefore, in the present invention, each of the servers 20 that can operate independently will automatically monitor and share their own status and that of the adjacent servers 20 when configuring adjacent servers 20, while also sharing their interconnected power source P2. In this way, when any of the servers 20 is heavily loaded, the power supply 201 mounted on it is less likely to be damaged or rapidly aged.

To sum up, in some embodiments, the number of the power supplies 101 comprised in the multi-node server 1 of the present invention is only half of the number of the power supplies comprised in the multi-node server of the prior art. In other words, the cost and weight of the multi-node server 1 are significantly reduced compared to the multi-node servers of the prior art. And when one of the power supplies 101 of the nodes 10 fails, the control circuit 103 of each of the non-failed nodes 10 directly receives the power status signal S1 with information about the failure of one of the power supplies 101 through the transmission circuit 102 and immediately sends the boosting power signal S3 to the power supply 101 to increase the power of the power source P provided. The increased power source P is directly transmitted to the failed node 10 through the transmission circuit 102, so that the failed node 10 can still operate normally.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A multi-node server, comprising a plurality of nodes, wherein each of the nodes comprises:
   a power supply configured to provide power;
   a transmission circuit coupled to the power supply, wherein the transmission circuit is configured to transmit the power and a power status signal to the transmission circuit of the two adjacent nodes, and is configured to receive the power and the power status signal of the two adjacent nodes; and
   a control circuit coupled to the power supply and the transmission circuit, wherein the control circuit is configured to control the transmission circuit and the power supply to transmit the power and the power status signal to the transmission circuit of the two adjacent nodes;
   wherein the transmission circuit of each of the nodes are connected in series as a ring circuit;
   wherein a number of the nodes is N, the power of the power supply is $P_s$, a total power budget of the multi-node server is $P_b$, and $P_s = P_b/(N-1)$.

2. The multi-node server according to claim 1, wherein when one of the power supplies of the nodes fails, the control circuit of the node comprising the failed power supply records failure information of the power supply in the power status signal.

3. The multi-node server according to claim 2, wherein the control circuit is further configured to receive the power status signal of the two adjacent nodes through the transmission circuit, and when the control circuit receives the power status signal of the two adjacent nodes, the control circuit sends a boosting power signal to the power supply to increase the power provided.

4. The multi-node server according to claim 3, wherein the nodes comprise a first node, a second node, and a third node, the transmission circuit comprises a first connection circuit and a second connection circuit, and the first connection circuit of the first node is configured to transmit the power and the power status signal of the first node to the second connection circuit of the second node coupled to a first side of the first node and is configured to receive the power and the power status signal of the second node transmitted by the second connection circuit of the second node, and the second connection circuit of the first node is configured to transmit the power and the power status signal of the first node to the first connection circuit of the third node coupled to a second side of the first node and is configured to receive the power and the power status signal of the third node transmitted by the first connection circuit of the third node.

5. The multi-node server according to claim 4, wherein the first connection circuit and the second connection circuit comprise a signal splitter circuit and a power distribution circuit, the signal splitter circuit of the first connection circuit of the first node is configured to transmit the power status signal of the first node to the signal splitter circuit of the second connection circuit of the second node coupled to the first side of the first node, and to receive the power status signal of the second node transmitted by the signal splitter circuit of the second connection circuit of the second node, the power distribution circuit of the first connection circuit of the first node is configured to transmit the power of the first node to the power distribution circuit of the second connection circuit of the second node coupled to the first side of the first node, and to receive the power of the second node transmitted by the power distribution circuit of the second connection circuit of the second node, the signal splitter circuit of the second connection circuit of the first node is configured to transmit the power status signal of the first node to the signal splitter circuit of the first connection circuit of the third node coupled to the second side of the first node, and to receive the power status signal of the third node transmitted by the signal splitter circuit of the first connection circuit of the third node, and the power distribution circuit of the second connection circuit of the first node is configured to transmit the power of the first node to the power distribution circuit of the first connection circuit of the third node coupled to the second side of the first node, and to receive the power of the third node transmitted by the power distribution circuit of the first connection circuit of the third node.

6. The multi-node server according to claim 5, wherein the power status signal comprises a local fault signal, a first fault signal, and a second fault signal, when the power supply of the first node fails, the control circuit of the first node sends the local fault signal of the first node to the first connection circuit of the first node and the second connection circuit of the first node, when the control circuit of the first node receives the local fault signal or the first fault signal of the second node through the first connection circuit of the first node, the control circuit of the first node sends the first fault signal of the first node to the second connection circuit of the first node, and when the control circuit of the first node receives the local fault signal or the second fault signal of the third node through the second connection circuit of the first node, the control circuit of the first node sends the second fault signal of the first node to the first connection circuit of the first node.

7. The multi-node server according to claim 6, wherein the transmission circuit comprises a selection circuit, the control circuit selectively transmits the local fault signal to the first connection circuit or the second connection circuit through the selection circuit, and selectively transmits the second fault signal to the first connection circuit or transmits the first fault signal to the second connection circuit through the selection circuit.

8. The multi-node server according to claim 7, wherein the transmission circuit is further configured to transmit a load sharing signal to the transmission circuit of the two adjacent nodes, the load sharing signal is jointly provided by the non-failed power supply of each of the nodes, and each of the power supplies adjusts the load sharing signal according to its own output status of the power.

9. The multi-node server according to claim 8, wherein the power supply of each of the nodes directly transmits and receives the load sharing signal through the transmission circuit, and each of the power supplies adjusts the power provided according to the received load sharing signal.

10. The multi-node server according to claim 8, wherein each of the control circuits receives the load sharing signal through the transmission circuit and controls the power supply to adjust the power according to the load sharing signal and output the adjusted power.

11. A rack server, comprising a plurality of servers, wherein each of the servers comprises:
a power supply configured to provide power;
a transmission circuit coupled to the power supply, wherein the transmission circuit is configured to transmit the power and a power status signal to the transmission circuit of the two adjacent servers, and is configured to receive the power and the power status signals of the two adjacent servers; and
a control circuit coupled to the power supply and the transmission circuit, wherein the control circuit is configured to control the transmission circuit and the power supply to transmit the power and the power status signal to the transmission circuit of the two adjacent servers;
wherein the transmission circuit of each of the servers are connected in series as a ring circuit;
wherein a number of the servers is N, the power of the power supply is $P_s$, a total power budget of the rack server is $P_b$, and $P_s = P_b/(N-1)$.

12. The rack server according to claim 11, wherein when one of the power supplies of the servers fails, the control circuit of the server comprising the failed power supply records failure information of the power supply in the power status signal.

13. The rack server according to claim 12, wherein the control circuit is further configured to receive the power status signal of the two adjacent servers through the transmission circuit, and when the control circuit receives the power status signal of the two adjacent servers, the control circuit sends a boosting power signal to the power supply to increase the power provided.

14. The rack server according to claim 13, wherein the servers comprise a first server, a second server, and a third server, the transmission circuit comprises a first connection circuit and a second connection circuit, and the first connection circuit of the first server is configured to transmit the power and the power status signal of the first server to the second connection circuit of the second server coupled to a first side of the first server and is configured to receive the power and the power status signal of the second server transmitted by the second connection circuit of the second server, and the second connection circuit of the first server is configured to transmit the power and the power status signal of the first server to the first connection circuit of the third server coupled to a second side of the first server and is configured to receive the power and the power status signal of the third server transmitted by the first connection circuit of the third server.

15. The rack server according to claim 14, wherein the first connection circuit and the second connection circuit comprise a signal splitter circuit and a power distribution circuit, the signal splitter circuit of the first connection circuit of the first server is configured to transmit the power status signal of the first server to the signal splitter circuit of the second connection circuit of the second server coupled to the first side of the first server, and to receive the power status signal of the second server transmitted by the signal splitter circuit of the second connection circuit of the second server, the power distribution circuit of the first connection circuit of the first server is configured to transmit the power of the first server to the power distribution circuit of the second connection circuit of the second server coupled to the first side of the first server, and to receive the power of the second server transmitted by the power distribution circuit of the second connection circuit of the second server, the signal splitter circuit of the second connection circuit of the first server is configured to transmit the power status signal of the first server to the signal splitter circuit of the first connection circuit of the third server coupled to the second side of the first server, and to receive the power status signal of the third server transmitted by the signal splitter circuit of the first connection circuit of the third server, and the power distribution circuit of the second connection circuit of the first server is configured to transmit the power of the first server to the power distribution circuit of the first connection circuit of the third server coupled to the second side of the first server, and to receive the power of the third server transmitted by the power distribution circuit of the first connection circuit of the third server.

16. The rack server according to claim 15, wherein the power status signal comprises a local fault signal, a first fault signal, and a second fault signal, when the power supply of the first server fails, the control circuit of the first server sends the local fault signal of the first server to the first connection circuit of the first server and the second connection circuit of the first server, when the control circuit of the first server receives the local fault signal or the first fault signal of the second server through the first connection circuit of the first server, the control circuit of the first server sends the first fault signal of the first server to the second connection circuit of the first server, and when the control circuit of the first server receives the local fault signal or the second fault signal of the third server through the second connection circuit of the first server, the control circuit of the first server sends the second fault signal of the first server to the first connection circuit of the first server.

17. The rack server according to claim 16, wherein the transmission circuit comprises a selection circuit, the control circuit selectively transmits the local fault signal to the first connection circuit or the second connection circuit through the selection circuit, and selectively transmits the second fault signal to the first connection circuit or transmits the first fault signal to the second connection circuit through the selection circuit.

18. The rack server according to claim 17, wherein the transmission circuit is further configured to transmit a load sharing signal to the transmission circuit of the two adjacent servers, the load sharing signal is jointly provided by the non-failed power supply of each of the servers, and each of the power supplies adjusts the load sharing signal according to its own output status of the power.

19. The rack server according to claim 18, wherein the power supply of each of the servers directly transmits and receives the load sharing signal through the transmission circuit, and each of the power supplies adjusts the power provided according to the received load sharing signal.

20. The rack server according to claim 18, wherein each of the control circuits receives the load sharing signal through the transmission circuit and controls the power supply to adjust the power according to the load sharing signal and output the adjusted power.

* * * * *